United States Patent
Kang et al.

(10) Patent No.: US 9,674,332 B2
(45) Date of Patent: Jun. 6, 2017

(54) VEHICLE INFORMATION PROVIDING TERMINAL, PORTABLE TERMINAL, AND OPERATING METHOD THEREOF

(71) Applicant: INFOBANK CORP., Seongnam-si, Gyeonggi-do (KR)

(72) Inventors: Hong Suk Kang, Yongin-si (KR); Ji Hoon Ah, Seoul (KR); Jong Cheol Hong, Seoul (KR)

(73) Assignee: INFOBANK CORP., Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/840,563

(22) Filed: Aug. 31, 2015

(65) Prior Publication Data

US 2016/0182701 A1    Jun. 23, 2016

(30) Foreign Application Priority Data

Dec. 19, 2014 (KR) .................. 10-2014-0184735
Dec. 19, 2014 (KR) .................. 10-2014-0184760

(51) Int. Cl.
*H04M 1/60* (2006.01)
*H04W 4/00* (2009.01)
*H04B 1/3822* (2015.01)

(52) U.S. Cl.
CPC ........ *H04M 1/6091* (2013.01); *H04B 1/3822* (2013.01); *H04W 4/008* (2013.01)

(58) Field of Classification Search
CPC ..... H04M 15/61; H04M 1/6091; H04W 4/12; H04W 4/24; H04W 4/008; H04B 1/3822
See application file for complete search history.

(56) References Cited

U.S. PATENT DOCUMENTS

| 2006/0199612 | A1 | 9/2006 | Beyer, Jr. et al. | |
| 2011/0195699 | A1* | 8/2011 | Tadayon | H04B 5/0062 455/418 |
| 2013/0331147 | A1* | 12/2013 | Chang | H04W 4/18 455/556.1 |

FOREIGN PATENT DOCUMENTS

| JP | 2005-033672 A | 2/2005 |
| JP | 4111790 B2 | 7/2008 |
| JP | 2011-159299 A | 8/2011 |
| KR | 10-2009-0057769 A | 6/2009 |
| KR | 10-2010-0022242 A | 3/2010 |
| KR | 10-2013-0078919 A | 7/2013 |

* cited by examiner

*Primary Examiner* — Joseph Dean, Jr.

(74) *Attorney, Agent, or Firm* — Novick, Kim & Lee, PLLC; Sang Ho Lee

(57) ABSTRACT

Provided is a vehicle interface providing terminal including: a wireless communication unit configured to receive a call signal transmitted from a base station; a terminal information collection unit configured to collect terminal information of other callable terminals; a vehicle interface generator configured to provide a vehicle interface to a vehicle information providing terminal and provide a selection list through the vehicle interface based on the terminal information when the call signal is received; and a call voice relay unit configured to relay a voice signal between a second terminal selected in the selection list and the base station, in which the call voice relay unit transmits the voice signal received from the base station and transmits the voice signal received from the second terminal to the base station, when the second terminal is selected.

11 Claims, 14 Drawing Sheets

VEHICLE INFORMATION PROVIDING TERMINAL, PORTABLE TERMINAL, AND OPERATING METHOD THEREOF

CROSS-REFERENCE TO RELATED APPLICATIONS

The present application claims benefit and priority to Korean patent application Nos. 10-2014-0184735 and 10-2014-0184760 filed on Dec. 19, 2014, the entire disclosures of which are hereby incorporated by reference.

TECHNICAL FIELD

The present invention relates to a vehicle information providing terminal provided in a vehicle, a terminal connected thereto, and an operating method thereof.

BACKGROUND ART

Terminals may be divided into mobile/portable terminals and stationary terminals according to whether the terminals are movable. Further, the mobile terminals may be divided into handheld terminals and vehicle mount terminals according to whether a user is directly portable.

Such a terminal may be implemented in a multimedia player having complex functions such as photographing still images or motion pictures, reproducing music or video files, games, reception of broadcasting, and navigations.

In order to support and increase functions of the terminal, it may be considered that a structural part of a software part of the terminal is improved.

Further, in modern times, as the penetration rate of smart phones is increased, techniques of controlling a vehicle information providing terminal or a smart phone have been distributed by wiredly or wirelessly connecting the smart phone of the user to a general vehicle information providing terminal which is provided in the vehicle.

However, in the case of a smart phone which is wiredly connected to a vehicle information providing terminal in the related art, when a user makes a call by receiving a call signal to the smart phone, there are problems in that the user separates the wiredly connected smart phone from the vehicle information providing terminal or needs to further use an apparatus such as a hands-free device, and it is difficult for other people other than a driver to make the call.

DISCLOSURE

Technical Problem

The present invention has been made in an effort to a terminal and an operating method thereof having an advantage of performing a call function to the other terminal by a user by transmitting a voice signal to the other terminal provided in a vehicle by using a short range wireless communication function, when a terminal connected to a vehicle information providing terminal in the vehicle receives a call signal.

Technical Solution

An embodiment of the present invention provides a vehicle information providing terminal providing vehicle information including: an interface unit connected with a terminal providing a vehicle interface; an output unit configured to receive and output the vehicle interface provided to the interface unit and provide a selection list through the vehicle interface when a call signal is received from the terminal; and a user input unit configured to receive a selection input for selecting a callable second terminal from the selection list.

Another embodiment of the present invention provides a vehicle interface providing terminal including: a wireless communication unit configured to receive a call signal transmitted from a base station; a terminal information collection unit configured to collect terminal information of other callable terminals; a vehicle interface generator configured to provide a vehicle interface to a vehicle information providing terminal and provide a selection list through the vehicle interface based on the terminal information when the call signal is received; and a call voice relay unit configured to relay a voice signal between a second terminal selected in the selection list and the base station.

According to another embodiment of the present disclosure, an operating method of a vehicle information providing terminal and a terminal connected to the vehicle information providing terminal is provided. The method includes generating a vehicle interface by the first terminal to provide the generated vehicle interface to the vehicle information providing terminal, outputting a vehicle interface provided by the vehicle information providing terminal, receiving a call signal from the base station by the first terminal, retrieving a callable second terminal provided in the vehicle and transmitting a list of the retrieved second terminals to the vehicle information providing terminal, by the first terminal, outputting the list of the second terminals by the vehicle information providing terminal, selecting any one second terminal from the list of the second terminals output by the vehicle information providing terminal, and relaying a remote call with the selected second terminal by the first terminal.

Advantageous Effects

According to the embodiment of the present invention, when the first terminal of the driver is wiredly/wirelessly connected to the vehicle information providing terminal in the vehicle by the driver while driving the vehicle, if a call signal is received to the first terminal connected with the vehicle information providing terminal, the user selects any one second terminal which is included in the vehicle to be called by the user to perform a call function through the selected second terminal.

Therefore, it is possible to overcome an inconvenience of separating the first terminal and the vehicle information providing terminal from each other when receiving a telephone call and easily make the phone call by a passenger riding in the vehicle as well as the driver.

MODE FOR INVENTION

Hereinafter, terminals according to the present invention will be described in more detail with reference to the accompanying drawings. Further, "module" and "unit" which are suffixes for the components used in the specification are granted or mixed by considering only easiness in preparing the specification and do not have meanings or roles distinguished from each other in themselves.

In terminals described in this specification, a mobile phone, a smart phone, a laptop computer, a digital broadcasting terminal, personal digital assistants (PDA), a portable multimedia player (PMP), a navigation, and the like may be included. Next, an overall system including terminals according to an embodiment of the present invention will be described with reference to FIG. 1.

Figure 1:
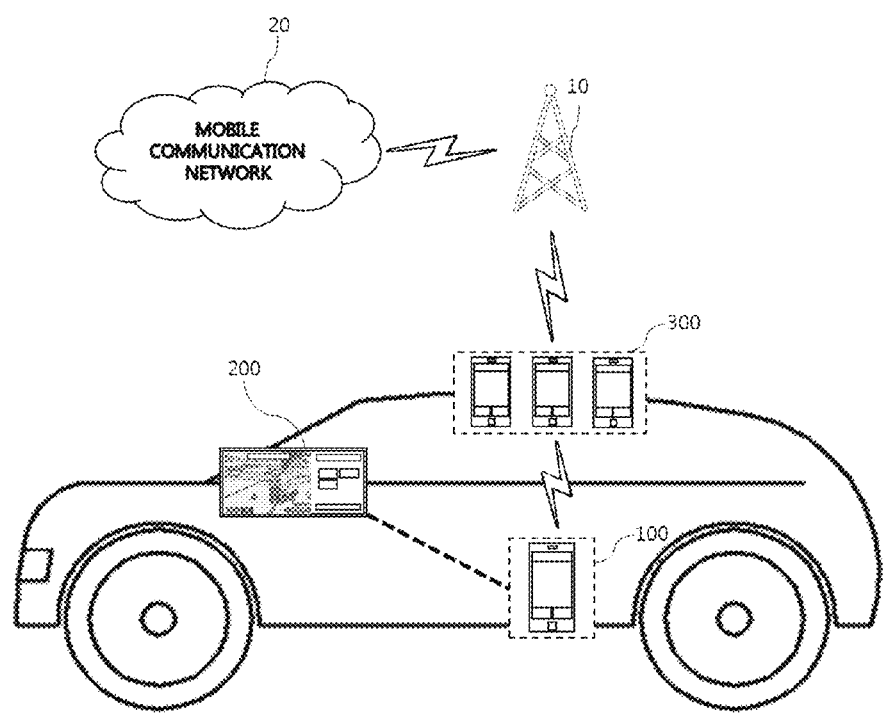
FIG. 1 is an exemplary diagram illustrating a state where a plurality of terminals is wiredly/wirelessly connected with a vehicle information providing terminal in a vehicle according to an exemplary embodiment of the present invention.

FIG. 1 is an exemplary diagram illustrating a state where a plurality of terminals is wiredly/wirelessly connected with a vehicle information providing terminal in a vehicle according to an exemplary embodiment of the present invention.

An overall system according to an embodiment of the present invention is configured by a first terminal 100, a vehicle information providing terminal 200, and a second terminal 300, which are positioned in a vehicle.

The vehicle information providing terminal 200 may be implemented by various devices which are provided or installed in the vehicle. For example, the vehicle information providing terminal 200 may be implemented by various devices, such as a navigation system capable of performing route guidance to a predetermined point, a black box storing or transmitting image information by photographing a surrounding of the vehicle, a smart phone, a tablet computer, a laptop computer, a personal digital assistant (PDA), and a portable multimedia player (PMP). In the case where the vehicle information providing terminal 200 is implemented by the black box for the vehicle, the vehicle information providing terminal 200 may be implemented in itself or to be integrated with the navigation system.

The vehicle information providing terminal 200 according to the embodiment of the present invention which may perform such an operation may be implemented by, for example, a navigation system for a vehicle, a black box for the vehicle, or an augmented reality system.

In the case where the vehicle information providing terminal 200 is the navigation system for the vehicle or the augmented reality system, the vehicle information providing terminal 200 may mean a system which notifies various kinds of data regarding operation, maintenance, and the like of the vehicle to a driver and a passenger of the vehicle. In this case, the vehicle information providing terminal 200 may be the navigation system for the vehicle itself and may be referred to as a concept including various kinds of display devices operating in connection with the first terminal 100 proving a vehicle interface widely or wirelessly.

Particularly, the first terminal 100 may configure a system integrated by providing various information which may provide, compensate for, and increase a function of the navigation system for the vehicle by the vehicle information providing terminal 200. In the overall system, the first terminal 100 may be implemented by a smart phone which may be connected to a mobile communication network, a tablet computer, a laptop computer, a personal digital assistant (PDA), a portable multimedia player (PMP), and the like.

The vehicle information providing terminal 200 is wiredly/wirelessly connected with the first terminal 100 to be positioned inside the vehicle. As a result, the user may control the first terminal 100 through the vehicle information providing terminal 200, and may also control the vehicle information providing terminal 200 by using the first terminal 100.

In addition, the first terminal 100 according to the embodiment of the present invention may autonomously output a first interface which may control a basic function of the first terminal 100 in a first mode. In the first mode, basically, the first terminal 100 may perform functions provided to the user, regardless of the function of the vehicle information providing terminal 200. For example, the basic function may include a call function, a text function, an internet function, a memo function, a schedule function, or the like.

In addition, the first terminal 100 according to the embodiment of the present invention may be connected with the vehicle information providing terminal 200. In this case, the first terminal 100 outputs a vehicle interface to the vehicle information providing terminal 200 and may be shifted to a second mode in which the vehicle interface is controlled. Particularly, in the second mode, the first terminal 100 generates a control signal for controlling the vehicle interface to control the vehicle interface. Meanwhile, one or more second terminals 300 which are wirelessly connected with the vehicle information providing terminal 200 and the first terminal 100 may be further included inside the vehicle.

The second terminal 300 may be a general portable terminal. The second terminal 300 may be provided inside the vehicle, and a plurality of second terminals 300 may be provided.

Further, the first terminal 100 and the second terminal 300 may receive a call signal through the base station 10 and the mobile communication network 20.

Next, a structure of the first terminal 100 according to the embodiment of the present invention will be described with reference to FIG. 2.

Figure 2:
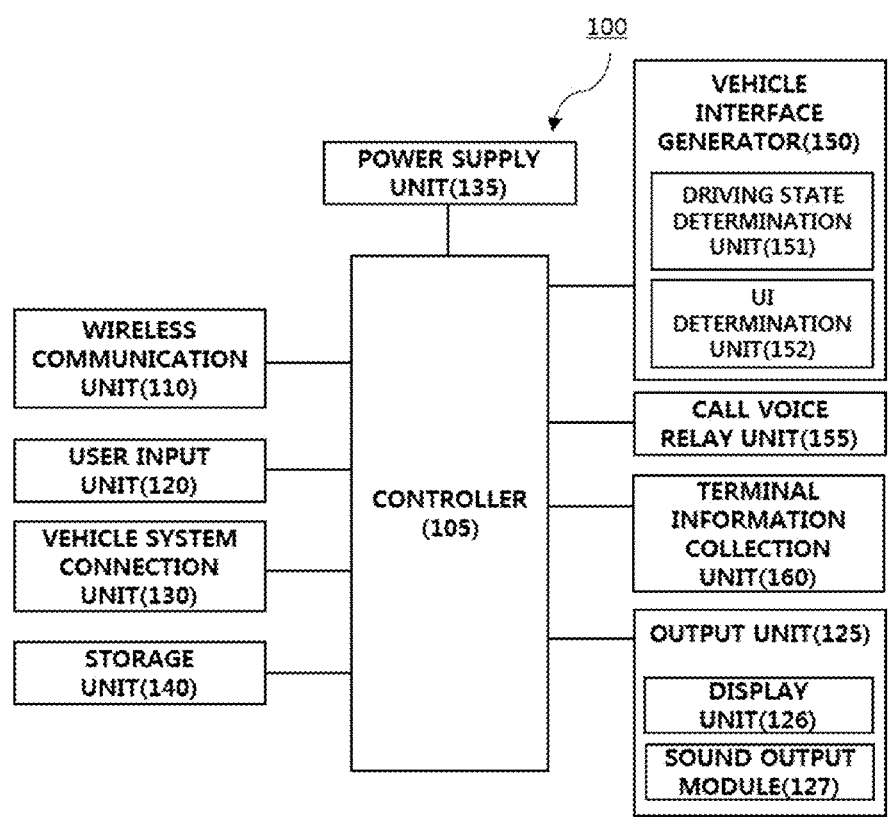
FIG. 2 is a block diagram illustrating a structure of a first terminal according to the embodiment of the present invention.

FIG. 2 is a block diagram of the first terminal 100 according to the embodiment of the present invention.

The first terminal 100 may include a controller 105, a wireless communication unit 110, a user input unit 120, an output unit 125, a vehicle system connection unit 130, a power supply unit 135, a storage unit 140, a vehicle interface generator 150, a call voice relay unit 155, and a terminal information collection unit 160.

The components illustrated in FIG. 2 are not essential components. Therefore, the first terminal 100 having more components therethan or less components therethan may be implemented.

Hereinafter, the components will be described in sequence.

First, the wireless communication unit 110 may include one or more modules which enable wireless communication between the networks. For example, the wireless communication unit 110 may include a mobile communication module, a wireless internet module, a short-range communication module, a position information module, and the like, and enables communication with the second terminal 300 or the base station.

The mobile communication module transceives a wireless signal with at least one of the base station, an external terminal, and a server on the mobile communication network. The wireless signal may include a voice signal, a video signal, a voice call signal, a video call signal, or various types of data according to transmission and reception of texts/multimedia messages.

The wireless internet module means a module for wireless internet access and may be internally or externally installed in the first terminal 100. As the wireless Internet technology, wireless LAN (WLAN) (Wi-Fi), wireless broadband (Wibro), world interoperability for microwave access (Wimax), high speed downlink packet access (HSDPA), or the like, may be used.

The short range communication module means a module for short range communication. As the short range communication technology, Bluetooth, radio frequency identification (RFID), infrared data association (IrDA), ultra wideband (UWB), ZigBee, or the like may be used.

The position information module is a module for acquiring a position of the mobile terminal, and as a representative example, includes a global position system (GPS) module, and the position information may be used for generating the vehicle interface.

The user input unit 120 generates input data for controlling an operation of the first terminal 100 by the user. The user input unit 120 may be configured by a key pad, a dome switch, a touch pad (static pressure/static electricity), a jog wheel, a jog switch, or the like.

The output unit 125 for generating an output related with sight, hearing, or touch may include a display unit 126, a sound output module 127, and the like.

The display unit 126 displays (outputs) information processed in the first terminal 100. For example, the first terminal 100 displays a user interface (UI) or a graphic user interface (GUI) related with a call in a call mode. Further, when the first terminal 100 is in a vehicle interface providing mode, the UI related with the vehicle interface providing may be displayed. The display unit 126 may include a liquid crystal display (LCD), a thin film transistor-liquid crystal display (TFT LCD), or the like.

The sound output module 127 may output audio data which are received from the wireless communication unit 110 or stored in the storage unit 140 in a call signal reception mode, a call mode, a recoding mode, a voice recognition mode, a broadcast reception mode, or the like. The sound output module 127 may also output a sound signal related with a function (e.g., a call signal reception sound, a massage reception sound, or the like) performed by the first terminal 100. The sound output module 127 may include a receiver, a speaker, a buzzer, and the like.

The storage unit 140 may store a program for operating the controller 105 and also temporarily store input/output data.

The vehicle system connection unit 130 serves as a passage with the vehicle system connected to the first terminal 100. The vehicle system connection unit 130 receives the data from the vehicle system, receives power to transfer the power to each component inside the first terminal 100, or allow the data inside the first terminal 100 including the vehicle interface to be transmitted to the vehicle system.

For example, a wired/wireless headset port, an external charger port, a wired/wireless data port, a memory card port, an audio input/output (I/O) port, a video input/output (I/O) port, an earphone port, and the like may be included in the vehicle system connection unit 130.

The controller 105 generally controls an overall operation of the first terminal 100. For example, the controller 105 performs related control and processing for voice calls, data communication, video calls, and the like. Further, the controller 105 may generate the vehicle interface by controlling the components and provide the generated vehicle interface to the vehicle information providing terminal 200.

The vehicle interface according to the embodiment of the present invention includes a GUI providing various information required by the driver of the vehicle. For example, the vehicle interface may be configured to include various interfaces such as a navigation interface capable of performing route guidance up to a predetermined point, a black box interface storing or transmitting video information by photographing a surrounding of the vehicle, a state information interface outputting state information of various electronic control units (ECUs) in the vehicle, and a control interface for controlling each ECU.

In addition, the controller 105 may generate data corresponding to the vehicle interface to provide the generated data to the vehicle information providing terminal 200, and the vehicle information providing terminal 200 may decode the data to output the vehicle interface. The data may have various formats for outputting the vehicle interface from the vehicle information providing terminal 200.

The vehicle interface generator 150 generates the vehicle interface according to a predetermined type and transfers the generated vehicle interface to the vehicle information providing terminal 200 through the vehicle system connection unit 130. The vehicle interface may be a combination of video or voice data or converted and transmitted into a control data format which may be output from the vehicle information providing terminal 200. As described above, the vehicle interface may include navigation information, other vehicle information, and the like.

Further, the controller 105 may generate a control signal for controlling the vehicle interface. The controller 105 may control the vehicle interface based on the control signal. As an example, the controller 105 generates the control signal to transfer the generated control signal to the vehicle information providing terminal 200. Further, as an example, the controller 105 generates a vehicle interface screen controlled according to the control signal through the vehicle interface generator 150 and may also provide the controlled vehicle interface screen to the vehicle information providing terminal 200.

For example, as the vehicle interface is output through the vehicle information providing terminal 200, the user may receive a vehicle audio video navigation system (AVN). The vehicle AVN may include various information associated with the vehicle driving.

Further, the vehicle interface may provide a list of selectable second terminals 300 when the call signal is received according to the embodiment of the present invention.

In addition, the vehicle interface generator 150 may include a driving state determination unit 151, a UI determination unit 152, and the like.

The driving state determination unit 151 determines a driving state of the vehicle while driving. For example, the driving state determination unit 151 may determine a current velocity of the vehicle, whether there are crossroads, whether the vehicle stops, and the like. Further, the driving state determination unit 151 may determine whether the driver is able to make a call. In addition, the driving state determination unit 151 generates driving state information based on the determined result to provide the generated driving state information to the UI determination unit 152.

The UI determination unit 152 determines a UI input method and a UI function of the vehicle interface based on the driving state information provided through the driving state determination unit 151. The vehicle interface may be controlled according to any one method of methods such as touch, voice recognition, and motion recognition, and the UI function may be partially limited according to the driving state. The call voice relay unit 155 relays a reception voice signal received from the base station 10 by the mobile communication module 111 of the first terminal 100 to be transferred to the second terminal 300 when the second terminal 300 to which call is transferred is selected and call starts. Further, the call voice relay unit 155 relays a transmission voice signal received through the short range communication module 113 from the second terminal 300 to be transmitted to the base station 10 through the mobile communication module 111 of the first terminal 100.

The terminal information collection unit 160 retrieves a callable second terminal 300 by the first terminal 100 and collects terminal information of the second terminal 300 which may be called to store the collected terminal information in the storage unit 140. The terminal information collection unit 160 may transmit a signal for requesting a callable state to the second terminal 300 positioned therearound, in order to retrieve the callable second terminal 300.

For example, in the case where the first terminal 100 is wiredly/wirelessly connected with the vehicle information providing terminal 200, when the call signal is received from the base station 10 through the mobile communication network, the terminal information collection unit 160 may retrieve the callable second terminal 300 by the first terminal 100 and provide the collected terminal information to the vehicle interface generator 150. The collected terminal information is included in the vehicle interface to be transmitted to the vehicle information providing terminal 200.

The power supply unit 135 receives external power and internal power by controlling the controller 105 to supply power required for operations of respective components. The power supply unit 135 is connected with a battery of the vehicle through the vehicle system connection unit 130 to receive operation power or charging power from the vehicle.

Next, a structure of the vehicle information providing terminal 200 according to the embodiment of the present invention will be described with reference to FIG. 3.

Figure 3:
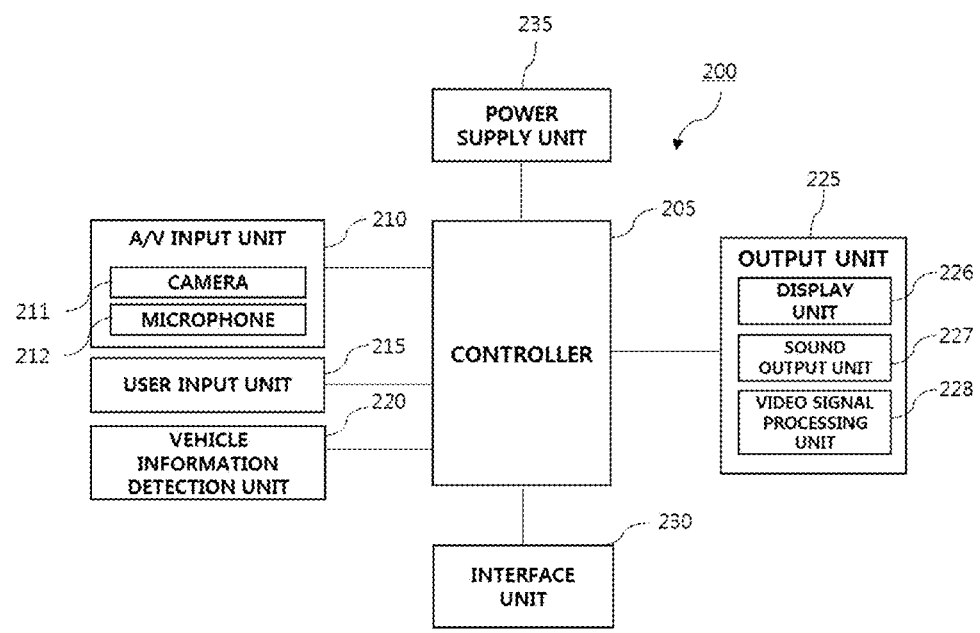
FIG. 3 is a block diagram illustrating the vehicle information providing terminal according to the embodiment of the present invention.

FIG. 3 is a block diagram of the vehicle information providing terminal 200 according to the embodiment of the present invention.

The vehicle information providing terminal 200 is wiredly/wirelessly connected with the aforementioned first terminal 100 and receives the generated vehicle interface from the first terminal 100 to perform the display. Further, the vehicle information providing terminal 200 detects the vehicle information and may add and output the detected vehicle information to the vehicle interface.

To this end, the vehicle information providing terminal 200 may include an AN input unit 210, a user input unit 215, a vehicle information detection unit 220, an output unit 25, an interface unit 230, a power supply unit 235, and the like.

The A/V input unit 210 provided in the vehicle information providing terminal 200 may be configured by a camera 211 and a microphone 212.

The camera 211 processes a video frame such as still images or motion pictures obtained by an image sensor in a video call mode or a photographing mode. The processed video frame may be displayed on the display unit 226. Further, the controller 205 may recognize a motion of the driver through the camera 211. The controller 205 may control the vehicle interface displayed on the output unit 225 according to the motion recognition.

The microphone 212 receives an external sound signal by a microphone in the call mode, the recording mode, the voice recognition mode, or the like to process the received sound signal to electrical voice data. The controller 205 may control the vehicle interface displayed on the output unit 225 according to the voice data, or control the control signal to be transferred to the first terminal 100 or the call voice to be transferred to the first terminal 100.

The user input unit 215 generates input data for controlling the operation of the terminal by the user. The user input unit 215 may be configured by a key pad, a dome switch, a touch pad (static pressure/static electricity), a jog wheel, a jog switch, or the like.

The vehicle information detection unit 220 detects the vehicle information of the vehicle attached with the vehicle information providing terminal 200. The detected vehicle information may be a driving velocity of the vehicle, driving information of the driver, whether the vehicle is driven, surrounding situation information, or the like. Further, the detected vehicle information is displayed on the vehicle interface through the output unit 225 and thus the state information of the vehicle may also be provided to the user.

The interface unit 230 serves as a passage with all external devices connected to the vehicle information providing terminal 200. The interface unit 230 receives vehicle interface data from the first terminal 100, receives power from an external power supply device to transfer the received power to each component the interface unit 230, or transmits the data in the vehicle information providing terminal 200 to an external device such as the first terminal 100.

Next, a structure of the second terminal 300 according to the embodiment of the present invention will be described with reference to FIG. 4.

Figure 4:
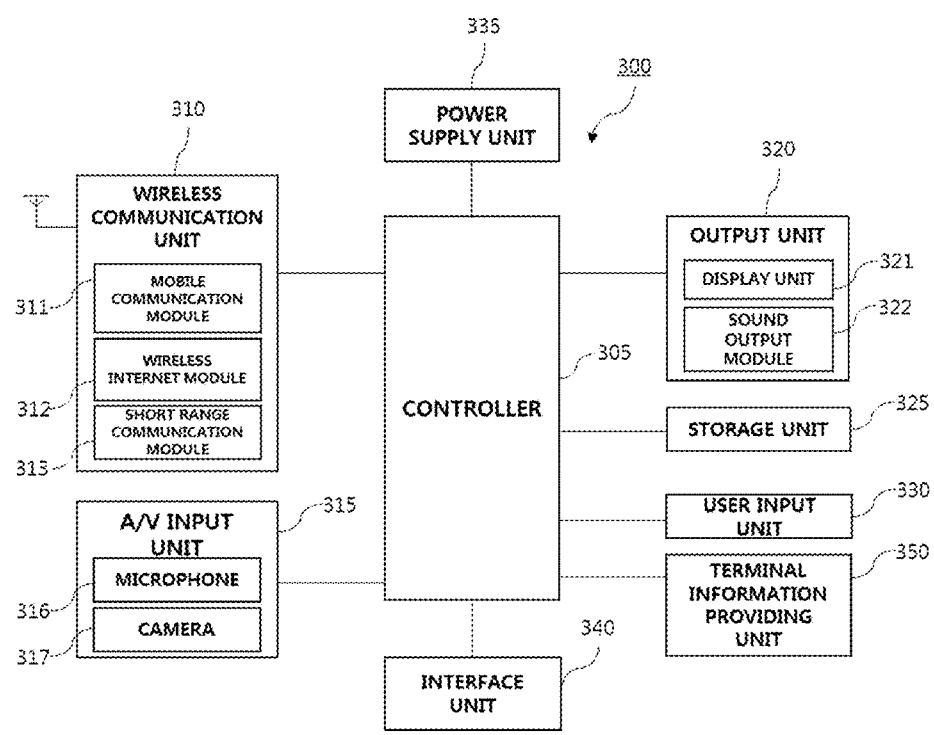
FIG. 4 is a block diagram illustrating a second terminal according to the embodiment of the present invention.

FIG. 4 is a block diagram of the second terminal 300 according to the embodiment of the present invention.

The second terminal 300 may include a controller 305, a wireless communication unit 310, an A/V input unit 315, an output unit 320, a storage unit 325, a user input unit 330, a power supply unit 335, an interface unit 340, and a terminal information providing unit 350.

The components illustrated in FIG. 4 are not essential components. Therefore, the second terminal 300 having more components therethan or less components therethan may be implemented.

Hereinafter, when describing the components in sequence, the description of a component similar to the structure of the first terminal 100 described in FIG. 2 will be omitted.

The terminal information providing unit 350 provides terminal information to the first terminal 100 through the short range communication module 313, when a signal for requesting a call state which is transmitted from the terminal information collection unit 160 of the first terminal 100 is received to the short range communication module 313 of the second terminal 300.

The terminal information may include at least one of information on a callable state and terminal identification information (a telephone number, a terminal serial number, or the like). The information on the callable state may vary according to a user setting of the second terminal 300.

The display unit 321 may output a phrase asking the callable state and whether the call is accepted, when a remote or relay call request is received from the first terminal 100. Further, the display unit 321 may further output a phrase notifying that the call is being made, when the second terminal 300 makes a remote or relay call with the first terminal 100.

The user input unit 300 may receive a command of accepting the remote call request from the user when the remote call request is received from the first terminal 100. Further, the user input unit 300 may receive a remote call end command even in the case where the second terminal 300 and the first terminal 100 are making the remote call.

When the call is selected, the controller 305 of the second terminal 300 controls the short range communication module 313, the output unit 320, the microphone 316, and the like to control the voice signal received from the first terminal 100 to be output and control the voice signal received from the microphone 316 to be transmitted to the first terminal 100.

The wireless communication unit 310 receives the voice signal transmitted from the first terminal 100 and transmits the voice signal input through the microphone 316 to the first terminal 100 when the remote call relayed in the first terminal 100 starts.

The output unit 320 outputs the voice signal received from the first terminal 100 when the remote call with the first terminal 100 starts.

Figure 5:
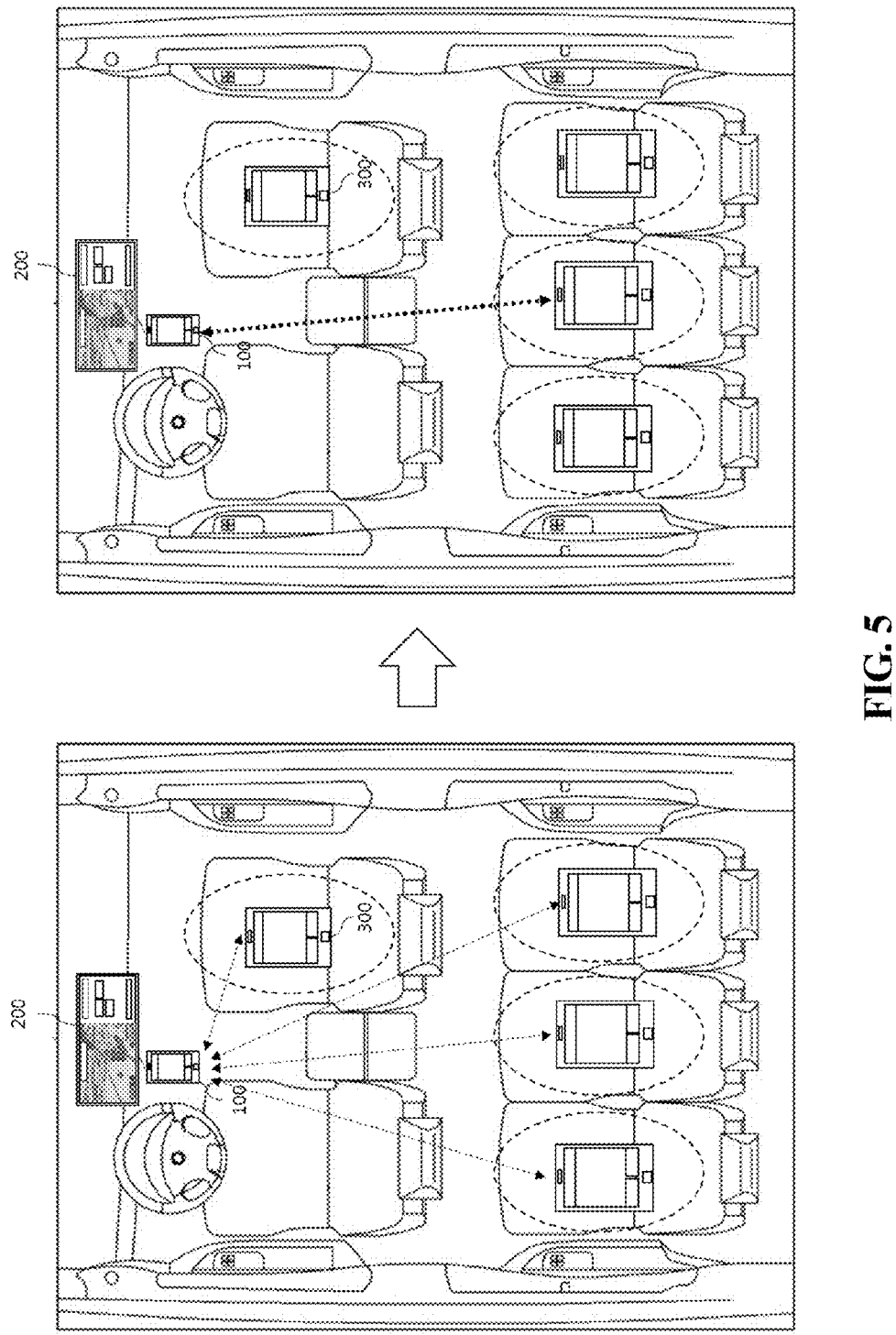
FIG. 5 is an exemplary diagram illustrating a situation in which the first terminal and the second terminal open a channel according to the embodiment of the present invention.

FIG. 5 is an exemplary diagram illustrating a situation in which the first terminal 100 and the second terminal 300 open a channel according to the embodiment of the present invention.

Figure 6:
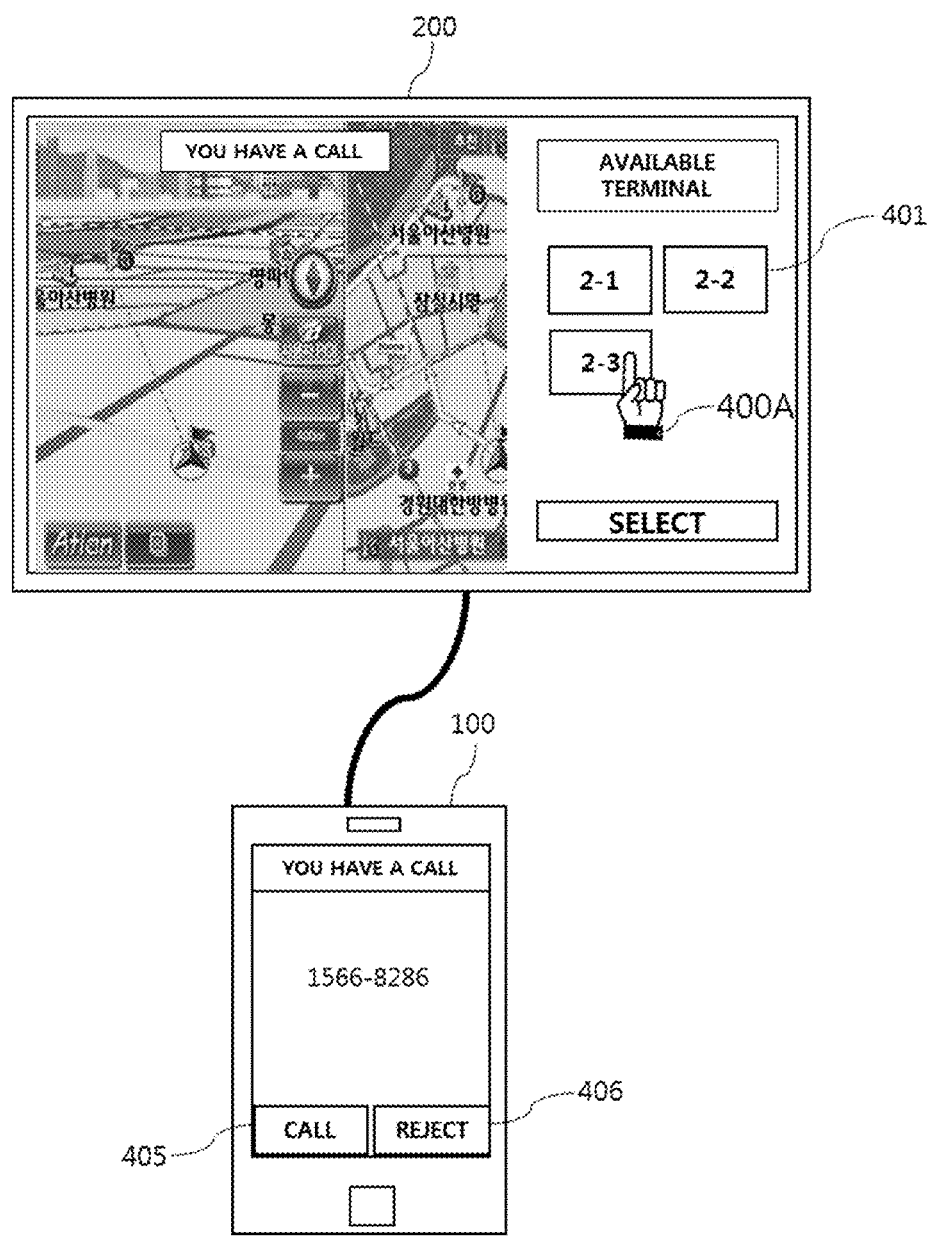
FIG. 6 illustrates an operation of the first terminal and the vehicle information providing terminal according to the embodiment of the present invention.

FIG. 6 illustrates an operation of the first terminal and the vehicle information providing terminal according to the embodiment of the present invention.

As illustrated in FIG. 5, the first terminal 100 may be wiredly/wirelessly connected with the vehicle information providing terminal 200.

The vehicle information providing terminal 200 receives and outputs the vehicle interface information provided from the first terminal 100. Accordingly, the driver may receive the vehicle interface output from the first terminal 100 through the vehicle information providing terminal 200 while driving.

In this case, when the call signal is received from the first terminal 100, the first terminal 100 retrieves a peripheral second terminal 300 which may be called in the vehicle. As illustrated in FIG. 5, when the peripheral second terminal 300 which may be called is retrieved, a selection list 410 of the peripheral second terminals 300 is output to the vehicle information providing terminal 200. When the user selects any one of the output selection list 401, whether the remote call is accepted is output to the selected second terminal 300, and when the user accepts the call, the first terminal 100 relays the remote call between the second terminal 300 and the base station 10.

That is, the second terminal 300 transmits the voice signal input from the user of the second terminal 300 rather than the driver to the first terminal 100, and the first terminal 100 sends the received voice signal to the base station 10. Further, the first terminal 100 transmits the voice signal transmitted from the base station 10 to the first terminal 100 to the second terminal 300 through the short range communication module 113. In addition, the second terminal 300 outputs the received voice signal to provide the output voice signal to the user of the second terminal 300.

In this case, when the user selects the acceptance from a screen of acceptance of the remote call output to the second terminal 300, the first terminal 100 may block a call voice input/output function of the first terminal 100 itself. This is to prevent the voice signal from being redundantly input to the microphones 116 and 316 of the first terminal 100 and the second terminal 300 when the first terminal 100 relays the remote call between the second terminal 300 and the base station 10 to be transmitted to the base station 10.

FIG. 6 illustrates operations of the first terminal and the vehicle information providing terminal according to the embodiment of the present invention.

As illustrated in FIG. 6, the vehicle information providing terminal 200 outputs the vehicle interface received from the first terminal 100.

As described above, when the call signal is received to the first terminal 100 connected with the vehicle information providing terminal 200, the selection list 401 of callable second terminals 300 is output to one side of the vehicle information providing terminal 200 as illustrated in FIG. 6.

Thereafter, when the driver selects any one selection list 401 among the output selection lists 401, a voice channel between the terminal selected through the selection list 401 and the first terminal 100 may be opened.

Meanwhile, the first terminal 100 receiving the call signal may display a phrase notifying that here's phone for you and a telephone number of a sender on the display unit 126. Further, the first terminal 100 may output a call selection 405 and a rejection selection 406.

The call selection 405 is a selection in which the user may directly make the call to the first terminal 100 when the user dose not want to make the remote call with the second terminal 300. Further, the rejection selection 406 is a selection in which a situation may end by rejecting the call signal received to the first terminal 100.

Figure 7:
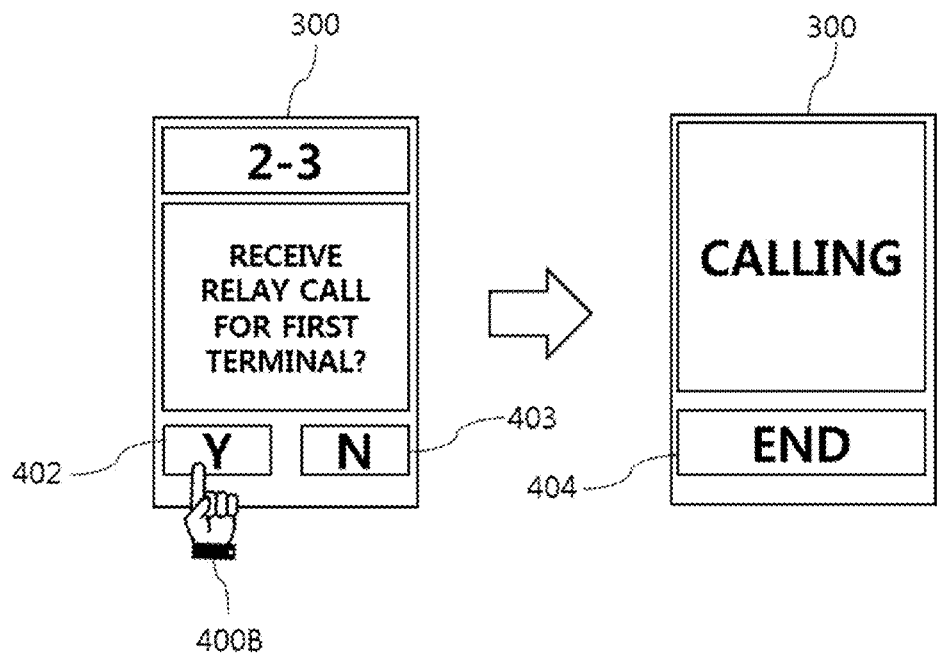
FIG. 7 illustrates a display change of the second terminal.

FIG. 7 illustrates a display change of the second terminal 300 selected from the selection list 401 output to the aforementioned vehicle information providing terminal 200.

As illustrated in FIG. 7, information of the terminal provided by the terminal information providing unit 350 and a phrase requesting the remote call from the first terminal 100 may be output to the upper portion of the selected second terminal 300.

Further, a 'Y' selection 402 and a 'N' selection 403 representing whether the remote call is accepted may be output to the second terminal 300.

Here, when the user selects the 'Y' selection 402, the second terminal 300 may make a remote call function with the first terminal 100. In addition, when the user selects the Y' selection 402, the phrase notifying that there's a busy signal may be output on the second terminal 300 and an end selection 404 in which the remote call may end may be provided.

Figure 8:
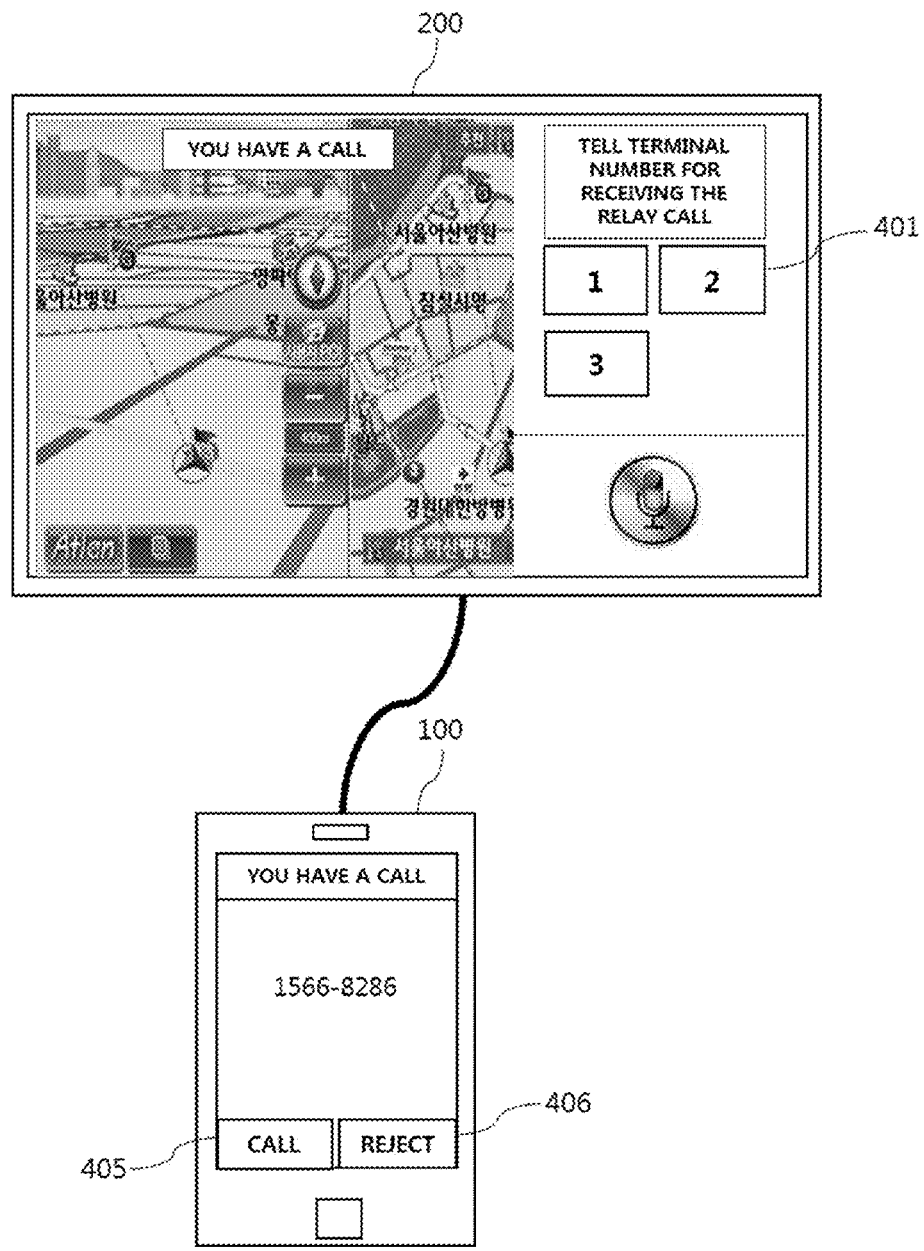
FIG. 8 illustrates controlling the vehicle information providing terminal through a voice signal according to the embodiment of the present invention.

FIG. 8 illustrates controlling the vehicle information providing terminal through a voice signal according to the embodiment of the present invention.

The vehicle information providing terminal 200 may output the vehicle interface provided from the first terminal 100. In this case, when the call signal is received in the first terminal 100, the selection list 401 of the callable second terminals 300 is output to one side of the vehicle information providing terminal 200 in figures. In addition, the microphone 212 of the vehicle information providing terminal 200 is activated to perform preparation to recognize the voice signal of the user.

Figure 9:
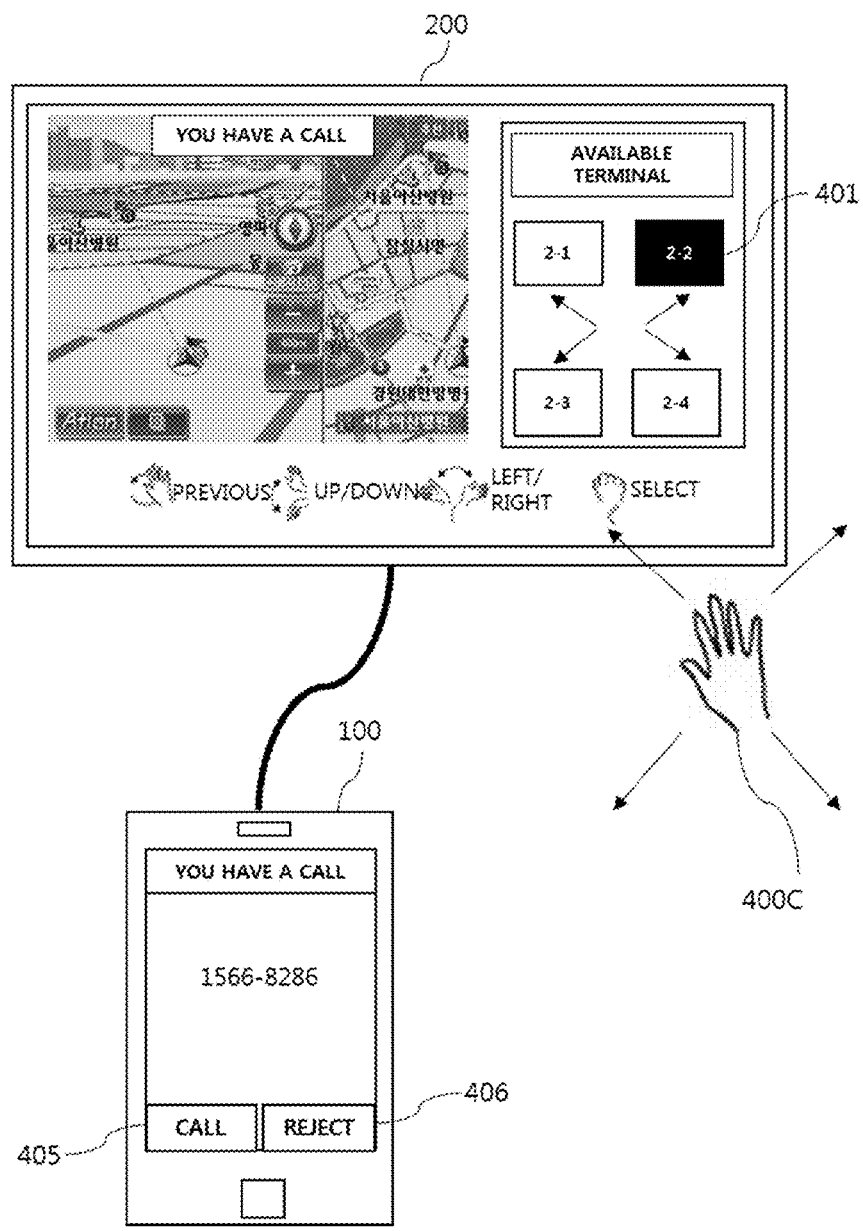
FIG. 9 illustrates controlling the vehicle information providing terminal through motion recognition according to the embodiment of the present invention.

In addition, when the user speaks the number of the selection list 401 of the second terminal 300 output to the vehicle information providing terminal 200, the voice signal for the corresponding number may be received through the microphone 212 of the vehicle information providing terminal 200. In addition, the vehicle information providing terminal 200 transfers the voice signal for the corresponding number to the first terminal 100, and the first terminal 100 may transmit a remote call request with the first terminal 100 to the second terminal 300 selected according to the voice signal for the corresponding number. FIG. 9 illustrates controlling the vehicle information providing terminal 200 through motion recognition according to the embodiment of the present invention.

The vehicle information providing terminal 200 may output the vehicle interface provided from the first terminal 100. In this case, when the call signal is received in the first terminal 100, the selection list 401 of the callable second terminals 300 is output to one side of the vehicle information providing terminal 200 in figures. In addition, the camera 211 of the vehicle information providing terminal 200 is activated to recognize the motion of the user.

The motion recognition may include a counterclockwise rotation motion, an upper/lower slap motion, a left/right slap motion, a grab motion, and the like. As a result, when the selection list 401 output to the vehicle information providing terminal 200 is primarily selected, the primarily selected selection is expressed by a different color from a non-selected selection to prevent confusion of the driver.

First, the counterclockwise rotation motion performs a pre-setting function. Further, in the upper/lower slap motion, a user's hand moves up and down to move the selection list 401 up and down.

The left/right slap motion may primarily select the selection list by controlling the selection list 401 output to the vehicle information providing terminal 200 right and left. In addition, the grab motion may finally select the selection list 401 primarily selected through the above process.

The motion recognition may be controlled by hands of all passengers riding in the vehicle as well as the user's hand.

In addition, the vehicle information providing terminal 200 may provide identification information for the second terminal 300 selected according to the motion recognition to the first terminal 100, and the first terminal 100 may transmit the remote call request to the second terminal 300.

Figure 10:
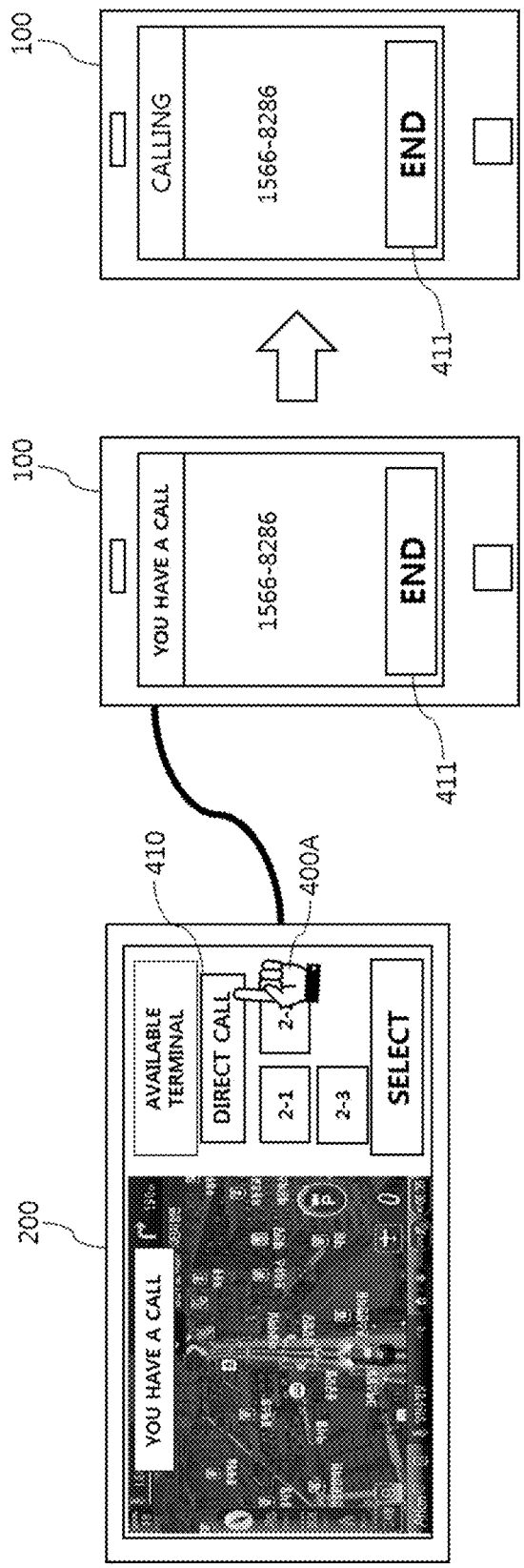
FIG. 10 illustrates a case where a user directly makes a call through the first terminal when receiving a call signal in a situation where the driver may make a call through the first terminal according to the embodiment of the present invention.

FIG. 10 illustrates a case where a user directly makes a call through the first terminal 100 when receiving a call signal in a situation where the driver may make the call through the first terminal 100 according to the embodiment of the present invention.

As described above, the driving state determination unit 151 of the first terminal 100 may determine the driving state of the vehicle while driving. As a result, as illustrated in FIG. 10, in a condition such as low-speed driving of the vehicle and a vehicle stop state, a direct call selection 410 may be further provided to the vehicle information providing terminal 200 so that direct call enables through the first terminal 100.

For example, when the call signal is received in the first terminal 100, the driving state determination unit 151 may provide a determination result to the UI determination unit 152 when it is determined that the driver may receive the call. Further, the UI determination unit 152 may further output the direct call selection 410 based on the received driving state information.

In addition, when it is determined that the driver may directly make the call through the first terminal 100, the driver may make the direct call through the first terminal 100 by selecting the direct call selection 410.

Figure 11:
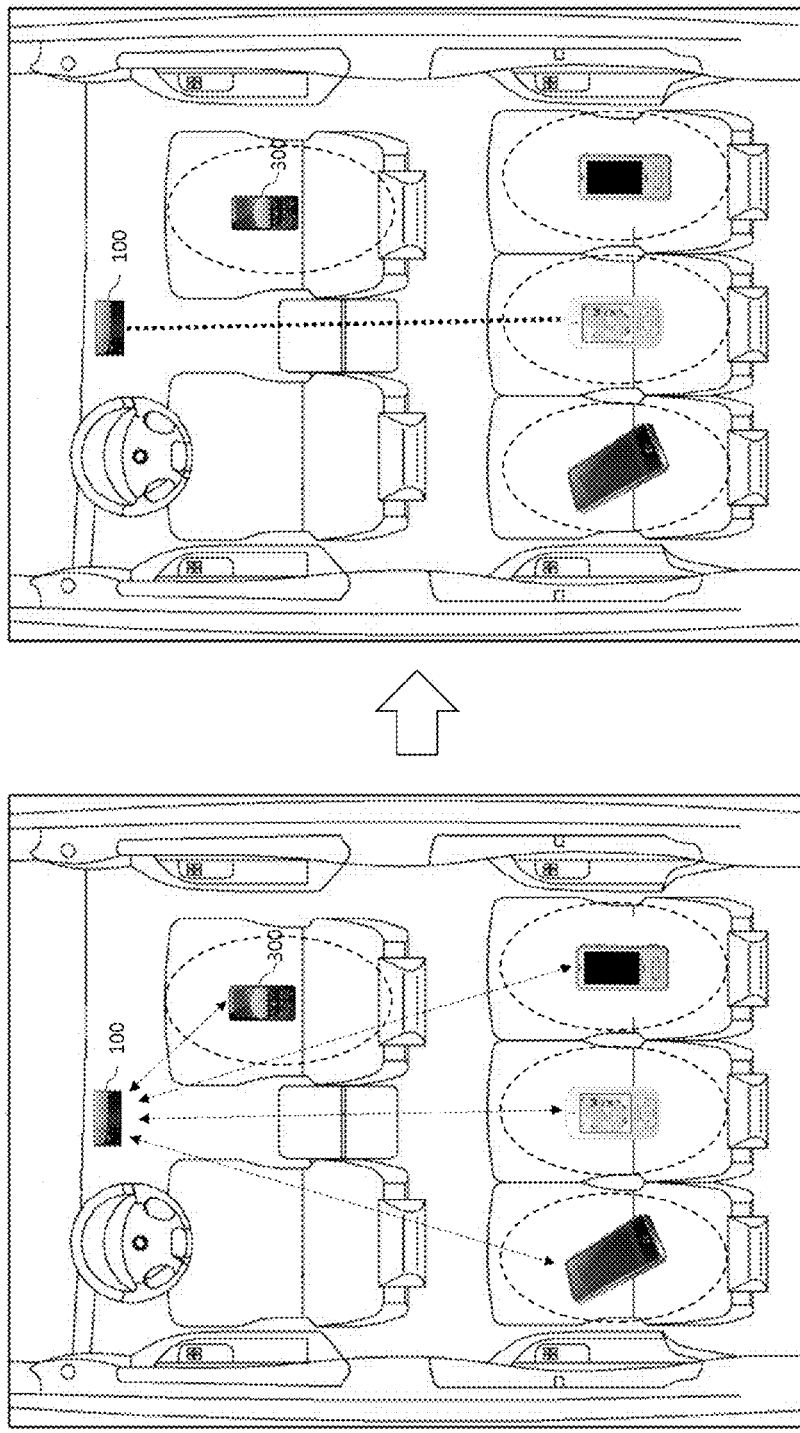
FIG. 11 illustrates a connection of a first terminal and a second terminal according to another embodiment of the present invention.

FIG. 11 illustrates a connection of a first terminal 100 and a second terminal 300 according to another embodiment of the present invention.

According to the embodiment of the present invention, the first terminal 100 may be directly attached to the vehicle to be provided to the driver In this case, when the call signal is received from the first terminal 100, the first terminal 100 retrieves a peripheral second terminal 300 which may be called in the vehicle. As illustrated in FIG. 11, when the peripheral second terminal 300 which may be called is retrieved, a selection list of the peripheral second terminals 300 is output to the first terminal 100. When the user selects any one of the output selection list, whether the remote call is accepted is output to the selected second terminal 300, and when the user accepts the call, the first terminal 100 relays the remote call between the second terminal 300 and the base station 10.

In addition, the second terminal 300 transmits the voice signal input from the user of the second terminal 300 to the first terminal 100, and the first terminal 100 sends the received voice signal to the base station 10. Further, the first terminal 100 transmits the voice signal transmitted from the base station 10 to the first terminal 100 to the second terminal 300 through the short range communication module 113. In addition, the second terminal 300 outputs the received voice signal to provide the output voice signal to the user of the second terminal 300.

In this case, when the user selects the acceptance from a screen of acceptance of the remote call output to the second terminal 300, the first terminal 100 may block a call voice input/output function of the first terminal 100 itself.

Figure 12:
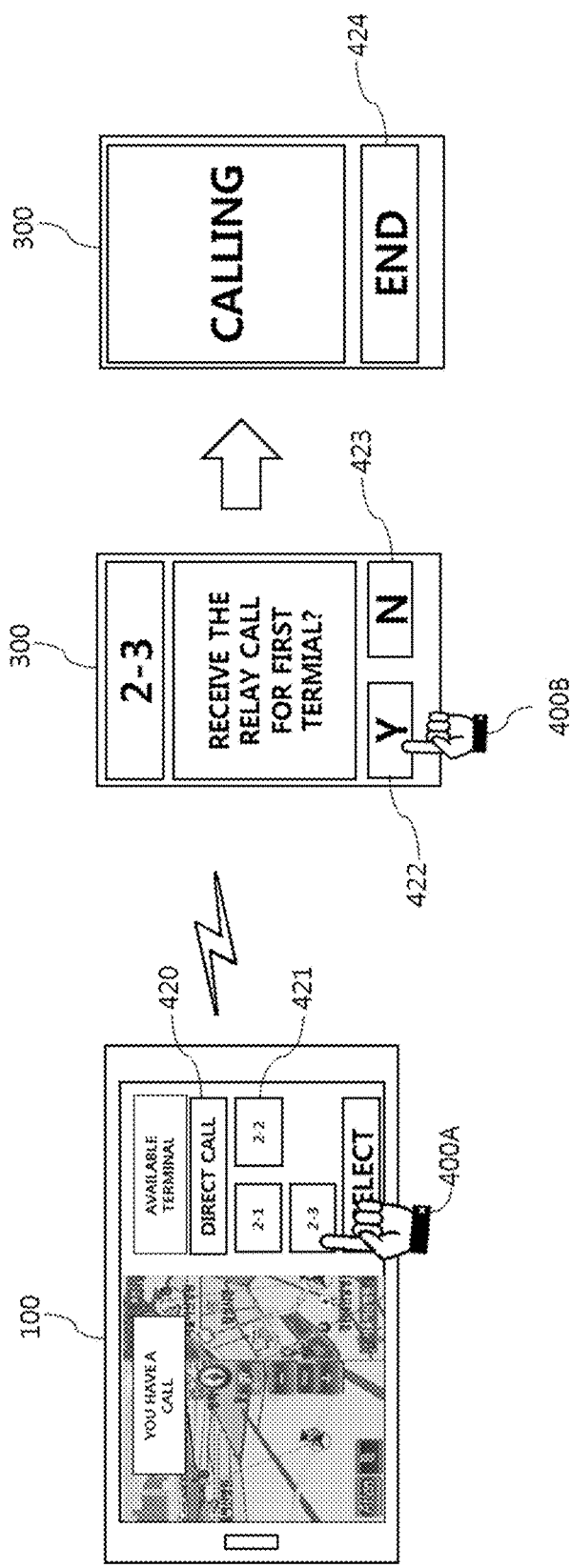
FIG. 12 illustrates a display screen of the first terminal and the second terminal according to another embodiment of the present invention.

FIG. 12 illustrates display screens of the first terminal 100 and the second terminal 300 according to another embodiment of the present invention.

As illustrated in FIG. 12, the first terminal 100 outputs the vehicle interface.

In addition, when the call signal is received in the first terminal 100, the selection list 401 of callable second terminals 300 is output to one side of the vehicle information providing terminal 200 as illustrated in FIG. 12.

Thereafter, when a driver 400A selects any one selection list 401 among the output selection lists 401, a terminal selected through the selection list 401 and the first terminal 100 receives whether a call channel with the first terminal 100 is opened.

Meanwhile, the first terminal 100 receiving the call signal may display a phrase notifying that here's phone for you and a telephone number of a sender on the display unit 126. Further, the first terminal 100 may further output a direct call selection 420.

The direct call selection 420 is a selection in which the user may make the direct call to the first terminal 100 when the user dose not want to make the remote call with the second terminal 300.

Meanwhile, on the top of the second terminal 300 selected through the selection list 401 of the first terminal 100, information of the terminal provided by a terminal information providing unit 350 and a phrase requesting the remote call from the first terminal 100 are output.

Further, a 'Y' selection 422 and a 'N' selection 423 asking whether the remote call is accepted may be output.

When the user selects the 'Y' selection 422, the user may make a remote call function with the first terminal 100, and when the user selects the 'N' selection 423, the remote call with the first terminal 100 is not made.

In addition, when the user selects the Y' selection 422, the second terminal 300 outputs a phrase notifying that there's a busy signal and receives an end selection 404 in which the remote call may end.

Further, when an end button 424 is selected during remote call by using the second terminal 300, the remote call of the first terminal 100 and the second terminal 300 ends and the call between the first terminal 100 and the base station 10 ends.

A method of selecting the selection button of FIG. 12 may be further implemented by the aforementioned touch, voice recognition, motion recognition, and the like, and is not limited to only touching the display device of the terminal as illustrated in FIG. 12.

Figure 13:
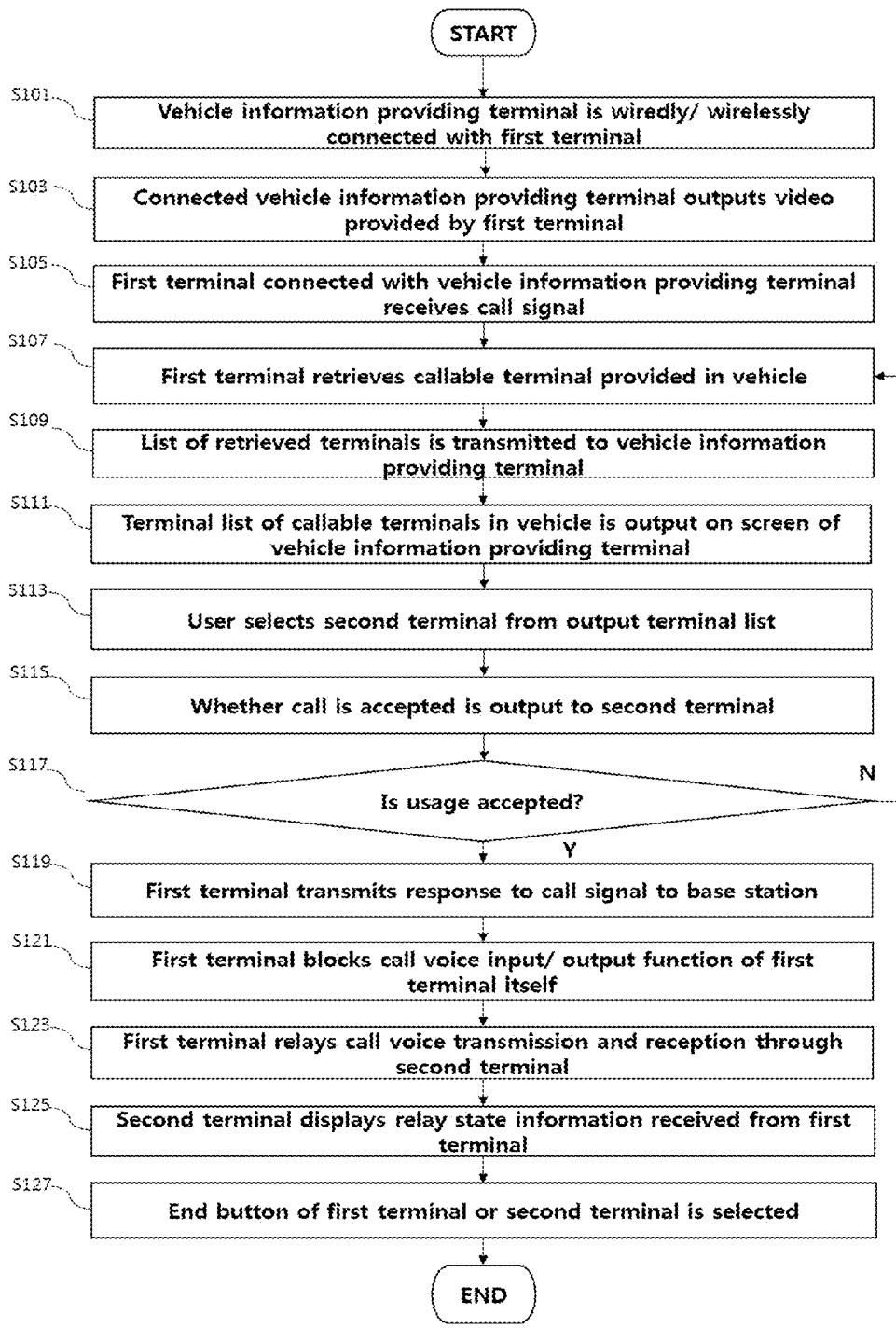
FIG. 13 is a flowchart illustrating an operating method of a terminal according to an embodiment of the present invention.

FIG. 13 is a flowchart illustrating an operating method of a terminal according to an embodiment of the present invention.

First, the first terminal 100 is wiredly wirelessly connected to the vehicle information providing terminal 200 (S101).

Thereafter, the vehicle information providing terminal 200 outputs a vehicle interface provided from the first terminal 100 (S103).

The vehicle information providing terminal 200 may output the vehicle interface through the output unit 225. The vehicle interface generator 150 of the first terminal 100 generates the vehicle interface to provide the generated vehicle interface to the vehicle information providing terminal 200, and the vehicle information providing terminal 200 outputs the received vehicle interface to provide the output vehicle interface to the driver.

In addition, the first terminal 100 connected with the vehicle information providing terminal 200 receives the call signal (S105).

The first terminal 100 connected with the vehicle information providing terminal 200 may receive the call signal from the base station 10.

Thereafter, the first terminal 100 retrieves a callable terminal provided in the vehicle (S107).

The terminal information collection unit 160 of the first terminal 100 transmits a signal of requesting the callable state to the second terminal 300 positioned therearound to retrieve the callable second terminal 300.

In addition, the first terminal 100 transmits a list of the retrieved terminals to the vehicle information providing terminal 200 (S109).

The first terminal 100 retrieves the callable second terminal 300 and provides the collected terminal information to the vehicle interface generator 150, and the collected terminal information may be included in the vehicle interface to be transmitted to the vehicle information providing terminal 200.

Thereafter, a list of callable terminals in the vehicle is output to the screen of the vehicle information providing terminal 200 (S111).

The vehicle interface generated in the first terminal 100 and the terminal list are received to be displayed. Further, the vehicle information providing terminal 200 detects vehicle information and may add and output the detected vehicle information to the vehicle interface.

Thereafter, the user selects any one second terminal 300 from the output terminal list (S113). In addition, whether the second terminal 300 accepts the call is output (S115).

The display unit 321 of the second terminal 300 may output a phrase asking the callable state and whether the call is accepted, when a remote call request is received from the first terminal 100.

In addition, when the user selects whether the call is accepted output to the second terminal 300 (S117), the first terminal 100 transmits a response to the call signal to the base station 10 (S119).

The first terminal 100 may respond to a request signal of the base station 10 through a mobile communication module 111.

In addition, the first terminal 100 blocks a call voice input/output function of the first terminal 100 itself (S121).

For example, in order to prevent the voice signal from being redundantly input to the microphones 116 and 316 of the first terminal 100 and the second terminal 300 to be transmitted to the base station 10, the first terminal 100 may block the call voice input/output function of the first terminal 100 itself.

In addition, the first terminal 100 relays call voice transmission and reception through the second terminal 300 (S123).

The voice signal input from the user of the second terminal 300 is transmitted to the first terminal 100, and the first terminal 100 sends the received voice signal to the base station 10. Further, the first terminal 100 transmits the voice signal transmitted from the base station 10 to the first terminal 100 to the second terminal 300 through the short range communication module 113. In addition, the second terminal 300 may output the received voice signal to provide the output voice signal to the user of the second terminal 300.

Thereafter, the second terminal 300 displays relay state information received from the first terminal 100 (S125 ).

When the second terminal 300 accepts the remote call, the display unit 321 of the second terminal 300 may output a phrase notifying that there's a busy signal.

Thereafter, a call end button of the first terminal 100 or the second terminal 300 is selected (S127).

The user selects an end button output to the output units 125 and 320 of the first terminal 100 and the second terminal 300 to end the telephone call.

Figure 14:
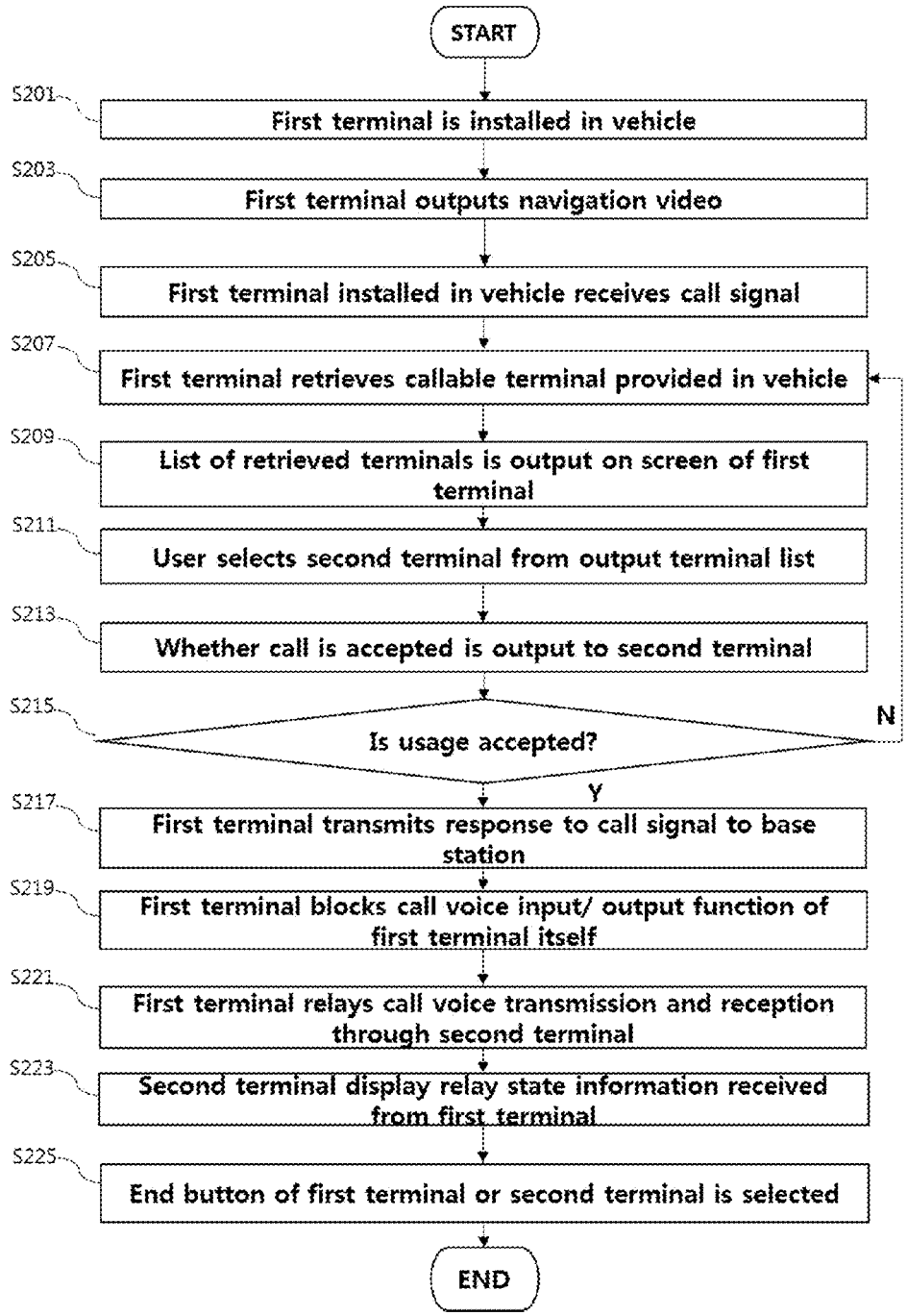
FIG. 14 is a flowchart illustrating an operating method of a terminal according to another embodiment of the present invention.

FIG. 14 is a flowchart illustrating an operating method of a terminal according to another embodiment of the present invention.

First, the first terminal 100 is installed in the vehicle (S201).

Thereafter, the installed first terminal 100 outputs a navigation image (S203).

The first terminal 100 provides navigation information by using a position information module 114. Further, the output unit 125 outputs the received navigation information to the display unit 126.

Thereafter, the first terminal 100 installed in the vehicle receives a call signal (S205).

The first terminal 100 may receive the call signal provided from the base station 10 through a mobile communication module 111.

In addition, the first terminal 100 retrieves a callable terminal provided in the vehicle (S207).

The terminal information collection unit 160 of the first terminal 100 transmits a signal of requesting the callable state to the second terminal 300 positioned therearound to retrieve the callable second terminal 300.

Thereafter, the first terminal 100 outputs a list of callable terminals (S209).

A vehicle interface generated in the first terminal 100 may be displayed.

Thereafter, the user selects any one second terminal 300 from the terminal list output in the first terminal 100 (S211).

In addition, whether the second terminal 300 accepts the call is output (S213).

The display unit 321 of the second terminal 300 outputs a phrase asking the callable state and whether the call is accepted, when a remote call request is received from the first terminal 100.

The user selects whether the call output in the second terminal 300 is accepted (S215).

The first terminal 100 transmits a response to the call signal to the base station 10 (S217).

The first terminal 100 responds to a request signal of the base station 10 through a mobile communication module 111.

The first terminal 100 blocks a call voice input/output function of the first terminal 100 itself (S219).

In order to prevent the voice signal from being redundantly input to the microphones 116 and 316 of the first terminal 100 and the second terminal 300 to be transmitted to the base station 10, the first terminal 100 blocks the call voice input/output function of the first terminal 100 itself.

The first terminal 100 relays call voice transmission and reception through the second terminal 300 (S221).

The voice signal input from the user of the second terminal 300 is transmitted to the first terminal 100, and the first terminal 100 sends the received voice signal to the base station 10. Further, the first terminal 100 transmits the voice signal transmitted from the base station 10 to the first terminal 100 to the second terminal 300 through the short range communication module 113. In addition, the second terminal 300 outputs the received voice signal to provide the output voice signal to the user of the second terminal 300.

The second terminal 300 displays relay state information received from the first terminal 100 (S223).

When the second terminal 300 accepts the remote call, the display unit 321 of the second terminal 300 may output a phrase notifying that there's a busy signal.

In addition, the user selects a call end button of the first terminal 100 or the second terminal 300 (S225). The user selects the end button output to the output units 125 and 320 of the first terminal 100 and the second terminal 300 to end the telephone call.

Through the process, in the present invention, when the first terminal 100 of the driver is wiredly/wirelessly connected to the vehicle information providing terminal 200 in the vehicle by the driver while driving the vehicle, if a call signal is received to the first terminal 100 connected with the vehicle information providing terminal 200, the user selects any one callable second terminal 300 which is included in the vehicle by the user to perform a call function through the selected second terminal 300. Therefore, it is possible to overcome an inconvenience of separating the first terminal 100 and the vehicle information providing terminal 200 from each other when receiving a telephone call and easily make the phone call by a passenger riding in the vehicle as well as the driver.

According to the embodiment of the present invention, the aforementioned method may be implemented as a code which is readable by a processor in a medium where the program is recorded. Examples of the medium which readable by the processor include a ROM, a RAM, a CD-ROM, a magnetic tape, a floppy disk, an optical data storage device, and the like, and may also be implemented by a form of a carrier wave (for example, transmission through Internet).

In the mobile terminal described above, the configurations and the methods of the embodiments described above may not be limitatively adopted, but all or some of the respective embodiments may be selectively combined and configured so that the embodiments may be variously modified.

| Explanation of Reference Numerals | |
|---|---|
| 100: First terminal | 105: Controller |
| 110: Wireless communication unit | 115: A/V input unit |
| 120: User input unit | 125: Output unit |
| 130: Interface unit | 135: Power supply unit |
| 140: Storage unit | 150: Vehicle interface generator |
| 155: Call voice relay unit | 160: Terminal information collection unit |
| 200: Vehicle information providing terminal | 205: Controller |
| 210: A/V input unit | 215: User input unit |
| 220: Vehicle information detection unit | 225: Output unit |
| 230: Interface unit | 235: Power supply unit |
| 300: Second terminal | 305: Controller |
| 310: Wireless communication unit | 315: A/V input unit |
| 320: Output unit | 325: Storage unit |
| 330: User input unit | 335: Power supply unit |
| 340: Interface unit | 350: Terminal information providing unit |

What is claimed is:

1. A first mobile terminal providing a graphic user interface (UI) to a vehicle interface providing terminal comprising:
   a wireless communication unit comprising a short range communication module and a mobile communication module and receiving a call signal transmitted from a base station through the mobile communication module;
   a terminal information collection unit collecting terminal information of other callable terminals which are connected to the short range communication module of the first mobile terminal;
   a vehicle interface generator providing the graphic user interface of a vehicle interface to the vehicle information providing terminal and providing a selection list through the vehicle interface based on the terminal information when the call signal is received; and
   a call voice relay unit relaying a voice signal of a remote call between a second mobile terminal selected in the selection list and the base station,
   wherein the call voice relay unit transmits through the short range communication module a voice signal received from the base station through the mobile communication module and transmits a voice signal received through the short range communication module from the second mobile terminal to the base station through the mobile communication module, while the remote call is being provided by the second mobile terminal's accepting the remote call.

2. The first mobile terminal providing a graphic user interface (UI) to a vehicle interface providing terminal of claim 1, wherein
the vehicle interface generator further includes
a driving state determination unit generating driving state information for determining whether the driver is able to receive a call; and
a UI determination unit determining a UI providing method of the vehicle interface based on the driving state information.

3. The first mobile terminal providing a graphic user interface(UI) to a vehicle interface providing terminal of claim 2, wherein the UI determination unit a direct call selection is provided through the vehicle interface in the case where it is determined that the driver is able to receive a call based on the driving state information.

4. The first mobile terminal providing a graphic user interface(UI) to a vehicle interface providing terminal of claim 2, wherein the UI determination unit determines the UI providing method of the vehicle interface as any one method of touch, voice recognition, and motion recognition and limits a partial function of the vehicle interface according to the driving state information.

5. The first mobile terminal providing a graphic user interface(UI) to a vehicle interface providing terminal of claim 1, wherein the call voice relay unit further includes a controller blocking a microphone input and a call voice output of the terminal or the vehicle information providing terminal.

6. A callable terminal including a microphone and positioned in a vehicle, the terminal comprising:
a wireless communication unit communicating through a short range communication module with a first mobile terminal providing a vehicle interface to a vehicle information providing terminal of the vehicle;
a terminal information providing unit providing terminal information to the first mobile terminal when a request for retrieving the callable terminal is received from the first mobile terminal;
an output unit outputting a remote call request message when a remote call request signal is received from the first terminal through the wireless communication unit; and
a user input unit receiving whether the remote call request message is accepted,
wherein the wireless communication unit receives a voice signal transmitted from the first mobile terminal and transmits a voice signal input through the microphone to the first mobile terminal when the remote call request is accepted, and
wherein a wireless communication unit of the first mobile terminal comprises a short range communication module and a mobile communication module,
wherein a call voice relay unit of the first mobile terminal relays a voice signal of the remote call between the callable terminal and the base station,
wherein the call voice relay unit of the first mobile terminal transmits through the short range communication module a voice signal received from the base station through the mobile communication module and transmits a voice signal received through the short range communication module from the callable terminal to the base station through the mobile communication module, while the remote call is being provided by the callable mobile terminal's accepting the remote call.

7. The callable terminal of claim 6, wherein the terminal information providing unit transmits the terminal information through the short range communication module included in the wireless communication unit, and the terminal information includes at least one of information on a callable state and terminal identification information.

8. A vehicle information providing terminal comprising:
an interface unit connected with a first mobile terminal providing a vehicle interface;
an output unit receiving and outputting the vehicle interface provided to the interface unit and providing a selection list through the vehicle interface when a call signal is received by the first mobile terminal; and
a user input unit receiving a selection input for selecting a callable second mobile terminal from the selection list,
wherein the interface unit transfers the selection input to the first mobile terminal receiving the call signal for a remote call between the first mobile terminal receiving the call signal and the second mobile terminal, and
wherein the first mobile terminal further comprises:
a wireless communication unit comprises a short range communication module and a mobile communication module and receives a call signal transmitted from a base station through the mobile communication module, and
a call voice relay unit relays a voice signal of a remote call between the second mobile terminal, and
wherein the call voice relay unit transmits through the short range communication module a voice signal received from the base station through the mobile communication module and transmits a voice signal received through the short range communication module from the second mobile terminal to the base station through the mobile communication module, while the remote call is being provided by the second mobile terminal's accepting the remote call.

9. The vehicle information providing terminal of claim 8, wherein the output unit provides a direct call selection through the vehicle interface when the driver is able to make a direct call.

10. The vehicle information providing terminal of claim 8, wherein the user input unit receives a selection input for selecting the second terminal in the selection list by using any one method of touch, voice recognition, and motion recognition.

11. The vehicle information providing terminal of claim 8, further comprising:
a vehicle information detection unit detecting at least one of a driving velocity of the vehicle, driving recording information, a driving state of the vehicle, and surrounding situation information of the vehicle to provide the detected information to the output unit.

* * * * *